US012810017B2

(12) United States Patent
Carette et al.

(10) Patent No.: US 12,810,017 B2
(45) Date of Patent: Nov. 24, 2026

(54) APPARATUS AND METHOD FOR PRIVACY CONTROL, DEVICE, CLOUD SERVER, APPARATUS AND METHOD FOR LOCAL PRIVACY CONTROL

(71) Applicant: Sony Group Corporation, Tokyo (JP)

(72) Inventors: Thomas Carette, Stuttgart (DE); Michele Minelli, Stuttgart (DE); Alexandru Serbanati, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 134 days.

(21) Appl. No.: 18/291,254

(22) PCT Filed: Aug. 1, 2022

(86) PCT No.: PCT/EP2022/071554

§ 371 (c)(1),
(2) Date: Jan. 23, 2024

(87) PCT Pub. No.: WO2023/012105

PCT Pub. Date: Feb. 9, 2023

(65) Prior Publication Data

US 2024/0281558 A1 Aug. 22, 2024

(30) Foreign Application Priority Data

Aug. 3, 2021 (EP) .................................... 21189431

(51) Int. Cl.
*G06F 21/00* (2013.01)
*G06F 21/62* (2013.01)

(52) U.S. Cl.
CPC ................................ *G06F 21/6245* (2013.01)

(58) Field of Classification Search
None
See application file for complete search history.

(56) References Cited

U.S. PATENT DOCUMENTS 9,419,841 B1 * 8/2016 Kozolchyk ........... H04L 9/3213
10,635,837 B1 * 4/2020 Jun ..................... G06F 21/6263
(Continued)

FOREIGN PATENT DOCUMENTS

WO 2017/157432 A1 9/2017

OTHER PUBLICATIONS

Mr. Justin Chueh, "DeCloak Launches the Smart Watch Reference Design to De-Identify Users' Personal Data", available online: https://innovex.computex.biz/2020/_uploads/202008241527048386.pdf, Aug. 23, 2020, 2 pages.
(Continued)

*Primary Examiner* — Shin-Hon (Eric) Chen
(74) *Attorney, Agent, or Firm* — Xsensus LLP

(57) ABSTRACT

An apparatus for privacy control is provided. The apparatus includes first interface circuitry configured to receive, from a data consumer, a request for accessing data of a user. The apparatus further includes processing circuitry configured to define an access policy for the data consumer for accessing the data based on the request and a global privacy policy of the user. The access policy defines to what extent the data consumer is allowed to access the data. The processing circuitry is further configured to generate an access key for accessing the data. The access key encodes the determined access policy. The apparatus further includes second interface circuitry configured to send the access key to the data consumer.

20 Claims, 7 Drawing Sheets

(56) References Cited

U.S. PATENT DOCUMENTS

| | | | | |
|---|---|---|---|---|
| 12,316,610 | B1 * | 5/2025 | Muth | H04L 63/102 |
| 2013/0096943 | A1 * | 4/2013 | Carey | G16B 50/40 705/2 |
| 2015/0372997 | A1 * | 12/2015 | Lokamathe | H04L 63/062 713/171 |
| 2016/0203333 | A1 * | 7/2016 | Fawaz | H04W 12/02 726/28 |
| 2018/0234403 | A1 * | 8/2018 | Casella | H04L 9/14 |
| 2019/0138743 | A1 * | 5/2019 | Nerurkar | G06N 20/10 |
| 2019/0147188 | A1 * | 5/2019 | Benaloh | G06F 21/6245 726/26 |
| 2019/0318121 | A1 | 10/2019 | Hockenbrocht et al. | |
| 2020/0236143 | A1 * | 7/2020 | Zou | G06F 21/1078 |
| 2021/0256151 | A1 * | 8/2021 | Damewood | G06F 21/6245 |
| 2021/0312064 | A1 * | 10/2021 | Arthur | G06F 21/6254 |
| 2021/0326476 | A1 * | 10/2021 | Su | H04L 9/50 |
| 2022/0052835 | A1 * | 2/2022 | Eldefrawy | H04L 9/0825 |
| 2022/0060514 | A1 * | 2/2022 | Hu | H04L 63/061 |
| 2022/0188446 | A1 * | 6/2022 | Vinayagamurthy | G06F 21/6227 |
| 2022/0327227 | A1 * | 10/2022 | Lécuyer | G06N 3/04 |
| 2022/0327238 | A1 * | 10/2022 | Bi | G06F 21/6254 |
| 2023/0239134 | A1 * | 7/2023 | Salomon | H04L 9/0891 713/165 |

OTHER PUBLICATIONS

Kasiviswanathan et al., "What can we learn privately?", SIAM Journal on Computing, vol. 40, No. 3, 2011, 1 page.

Maycock et al., "Hardware Enforced Statistical Privacy", IEEE Computer Architecture Letters, vol. 15, No. 1, Jan. 16, 2015, pp. 1-4.

Nguyen et al., "DuetSGX: Differential Privacy with Secure Hardware", arXiv:2010.10664v1, Oct. 20, 2020, pp. 1-5.

Dwork et al., "The algorithmic foundations of differential privacy", Theoretical Computer Science, vol. 9, Nos. 3-4, 2014, 281 pages.

Wook et al, "MPPDS: Multilevel Privacy-Preserving Data Sharing in a Collaborative eHealth System", IEEE Access, Aug. 21, 2019, vol. 7, pp. 109910-109923.

Li Jin et al., "Efficient and Secure Outsourcing of Differentially Private Data Publishing With Multiple Evaluators", vol. 19, No. 1, Aug. 11, 2020, pp. 67-76.

Perumal B. et al., "An Efficient Hierarchical Attribute Set Based Encryption Scheme with Revocation for Outsourcing Personal Health Records in Cloud Computing", Dec. 19-21, 2013, 5 pages.

International Search Report and Written Opinion mailed on Nov. 4, 2022, received for PCT Application PCT/EP2022/071554, filed on Aug. 1, 2022, 11 pages.

* cited by examiner

APPARATUS AND METHOD FOR PRIVACY CONTROL, DEVICE, CLOUD SERVER, APPARATUS AND METHOD FOR LOCAL PRIVACY CONTROL

CROSS-REFERENCE TO RELATED APPLICATIONS

The present application is based on PCT filing PCT/EP2022/071554, filed Aug. 1, 2022, which claims priority to European Patent Application No. 21189431.6, filed Aug. 3, 2021, the entire contents of each are incorporated herein by reference.

FIELD

The present disclosure relates to privacy control of data. Examples relate to an apparatus and a method for privacy control, an apparatus and a method for local privacy control, a device and a cloud server comprising the apparatus.

BACKGROUND

An individual may cause data traces across multiple distributed systems. Thereby, the distributed systems collect sensitive data of the individual. When a third party queries the data, the individual shall not be restricted to either share the data or not. Moreover, the privacy of the individual should be protected.

Hence, there may be a demand for improved privacy control for user data.

SUMMARY

This demand is met by apparatuses and methods in accordance with the independent claims. Advantageous embodiments are addressed by the dependent claims.

According to a first aspect, the present disclosure provides an apparatus for privacy control. The apparatus comprises first interface circuitry configured to receive, from a data consumer, a request for accessing data of a user. The apparatus further comprises processing circuitry configured to define an access policy for the data consumer for accessing the data based on the request and a global privacy policy of the user. The access policy defines to what extent the data consumer is allowed to access the data. The processing circuitry is further configured to generate an access key for accessing the data. The access key encodes the determined access policy. The apparatus comprises second interface circuitry configured to send the access key to the data consumer.

According to a second aspect, the present disclosure provides an apparatus for local privacy control. The apparatus comprises first interface circuitry configured to receive, from a data consumer, a request for accessing data of a user and an access key encoding an access policy. The access policy defines to what extent the data consumer is allowed to access the data. The apparatus further comprises processing circuitry configured to verify the access key and generate updated data by adding noise to the requested data according to the access policy. The apparatus further comprises second interface circuitry configured to send the updated data to the data consumer.

According to a third aspect, the present disclosure provides a device comprising the apparatus for local privacy control as described above. The apparatus is part of a trusted execution environment. The device further comprises at least one sensor configured to generate data of the user and send the data to the apparatus.

According to a fourth aspect, the present disclosure provides a cloud server. The cloud server comprises a trusted execution environment comprising the apparatus for local privacy control as described above. The cloud server further comprises interface circuitry configured to receive the data from a device of the user and transmit the data to the trusted execution environment.

According to a fifth aspect, the present disclosure provides a method for privacy control. The method comprises receiving, from a data consumer, a request for accessing data of a user. The method further comprises defining an access policy for the data consumer for accessing the data based on the request and a global privacy policy of the user. The access policy defines to what extent the data consumer is allowed to access the data. The method further comprises generating an access key for accessing the data. The access key encodes the determined access policy. The method further comprises sending the access key to the data consumer.

According to a sixth aspect, the present disclosure provides a method for local privacy control. The method comprises receiving, from a data consumer, a request for accessing data of a user and an access key encoding an access policy. The access policy defines to what extent the data consumer is allowed to access the data. The method further comprises verifying the access key and generating updated data by adding noise to the requested data according to the access policy. The method further comprises sending the updated data to the data consumer.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
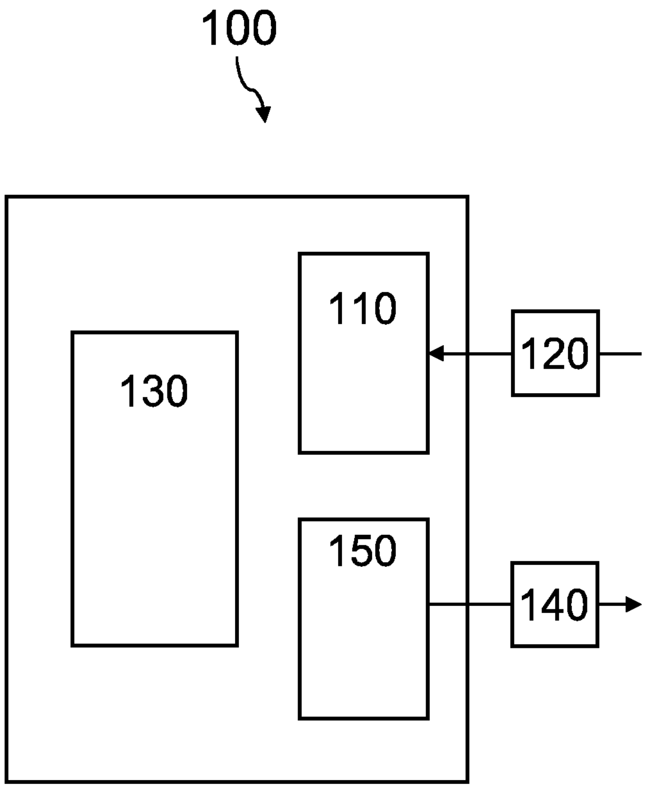
FIG. 1 illustrates an example of an apparatus for privacy control.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an example of an apparatus 100 for privacy control.

The apparatus 100 comprises first interface circuitry 110 configured to receive a request 120 for accessing data of a user from a data consumer. The data consumer may be a computing system, a subpart of a computing system, or a software on a computing system requesting the data of the user or additionally data from other entities with the intent to process data for a specific purpose, e.g., for analyzing a behavior of the user or for preparing combined data sets with data from other entities and using the combined data sets for further data analysis. The data consumer and the apparatus 100 may belong to different systems or to a shared system. In the latter case, the apparatus 100 may block the data consumer from inspecting or modifying data or programs of the apparatus 100.

For instance, the apparatus 100 may be part of a smartphone of the user and the data consumer may be a software application executed on the smartphone. The first interface circuitry 110 may receive the request 120 from the data consumer via a wired or wireless data connection or via a computer network, e.g., the Internet.

As used herein, the term "computing system" may include multiple constituent computing systems. Computing systems may, for example, be handheld devices, appliances, laptop computers, desktop computers, mainframes, distributed computer systems, datacenters, cloud server, or wearables.

As used herein, the term "user" may be understood as any entity that could benefit from the privacy control of the apparatus 100. For example, the user may be one or more human beings, an organization, or a company. The user may alternatively be a machine, a subpart of a machine, or a software integrating an executable software application acting as artificial intelligence, for instance.

The data of the user may be machine-readable data comprising any kind of information of the user. The information may describe behavior or features of the user or a different data subject. It is to be noted that the term "data subject" is not restricted to a definition given by the General Data Protection Regulation (GDPR). The data of the user may be, for example, sensitive information about the user such as sensor data captured by one or more wearable of the user or personal information such as biometric data, medical information, personally identifiable financial information. In case of the user being a company, the data of the user may be, for example, business information such as trade secrets, acquisition plans, financial data, or supplier and customer information. The data of the user may be stored on a device controlled by the user. The apparatus 100 may, e.g., be part of said device, may be part of a different device of the user, or may be part of a computing system the user does not control but has access to, e.g., a cloud service. The apparatus 100 may have no access to the data of the user, i.e., in case the apparatus 100 belongs to the device that stores the data of the user, the apparatus 100 may be isolated from a part of the device where the data is stored.

The request 120 may comprise machine-readable data indicating that the data consumer intents to access the data of the user. The request 120 may alternatively indicate that the data consumer intents to subscribe to a data stream with data of the user. The request 120 may further indicate properties of the requested data, e.g., from which time period the data of the user shall originate and which category of data (health data, mobility data, etc.) is requested. The request 120 may include additional information (metadata), such as: an identifier (ID) for authentication of the data consumer, a purpose of usage of the data, a level of noise in the data the data consumer is willing to accept, or a digital promise of returning a digital service to the user when receiving the data of the user.

The apparatus 100 further comprises processing circuitry 130. For example, the processing circuitry 130 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuitry 130 may optionally be coupled to, e.g., read only memory (ROM) for storing software, random access memory (RAM) and/or non-volatile memory. The processing circuitry 130 is coupled to the first interface circuitry 110.

The processing circuitry 130 is configured to define an access policy for the data consumer for accessing the data based on the request 120 and a global privacy policy of the user. The access policy defines to what extent the data consumer is allowed to access the data. For instance, the access policy may specify rules of how the data consumer is allowed to use the data of the user, for which purpose (e.g., economic or research) the data consumer is allowed to process the data of the user, with which entities (e.g., companies or governmental institutions) the data consumer is allowed to share the data of the user, how the data consumer is allowed to archive the data of the user, or when the data consumer is obliged to delete the data of the user. The processing circuitry 130 may additionally allocate a privacy budget to the data consumer and specify the allocated privacy budget in the access policy. The privacy budget is a quantity defining how much privacy may be lost (leaked) when publishing (outputting) the data of the user and originates from the concept of Differential Privacy (DP). For instance, with a higher privacy budget allocated to the data consumer, the data consumer may be allowed to access more data of the user, more sensitive data of the user or data with less noise. Usually, a maximum privacy budget is determined in the concept of DP. The maximum privacy budget may be a limit that shall not be exceeded when adding up all allocated/issued privacy budget of all data consumers.

The global privacy policy of the user may specify general rules of how to determine the access policy and to what extent the data may be shared with any data consumer. The global privacy policy may, e.g., ensure a compliance with data protection laws or regulations and a compliance with individual preferences of the user concerning data protection (privacy). For instance, the global privacy policy may specify how much privacy (in the sense of DP) of the user may be leaked and determine the maximum privacy budget. With every publication of data of the user, a remaining privacy budget may be reduced accordingly. However, the global privacy policy may also define a rule of replenishment for the maximum privacy budget, i.e., when and how the maximum privacy budget may be (partially) restored, or the user may be able to increase the maximum privacy budget. The global privacy policy may be determined by the user and may be adjustable only by the user.

The processing circuitry 130 may define the access policy for the data consumer, e.g., by following the general rules specified in the global privacy policy and allocating the privacy budget to the data consumer considering a limitation given by the remaining privacy budget.

The processing circuitry 130 also considers the request 120 of the data consumer for defining the access policy. For instance, if the request 120 proves that the data consumer is a trusted entity (based on the ID of the data consumer sent with the request 120) and indicates that the data consumer does not intend to share or further publish the data of the user, the processing circuitry 130 may classify the data consumer as non-critical (as defined in the global privacy policy) and grant a high privacy budget for the data of the user in the access policy (compared to a case when the data consumer is classified as critical). The high privacy budget may permit the data consumer to access many datapoints (devices of the user) and/or access a data stream with the data of the user for a long period time and/or access the data of the user with a low noise level. In other examples, the request 120 of the data consumer may indicate that the data consumer is willing to provide a digital service or any other valuables (e.g., money) in return for an access to the data of the user (digital promise). The global privacy policy may specify how to handle digital promises, e.g., the global privacy policy may provide a rule of how much a certain amount of privacy budget (or amount of data of a certain sensitivity level) may be "worth" and how much a certain digital promise may be "worth". Thus, the processing circuitry 130 may match the digital promise with a certain amount of privacy budget and define the access policy accordingly. The digital service defined by the digital promise may, e.g., grant the user an access to certain online services such as a temporarily limited usage of computing power provided by the data consumer or an access to information provided by the data consumer or to an online community controlled by the data consumer. In still other examples, the digital promise may grant a transfer of money in form of a digital currency in return of the access to the data of the user.

The processing circuitry 130 may be configured to check whether the request 120 is compatible (in accordance) with the global privacy policy. If not, the processing circuitry 130 may, for example, ignore the request 120 or send a denial report to the data consumer. In other examples, the processing circuitry 130 may "negotiate" terms of the access policy with the data consumer, i.e., the request 120 may be thought of a first proposal of terms of data access conditions provided by the data consumer. If the processing circuitry 130 denies the first proposal, the processing circuitry 130 may provide a second proposal of terms of data access conditions considering the global privacy policy and (at least partly) terms defined in the first proposal. If the data consumer accepts the second proposal, the processing circuitry 130 may define the access policy based on the second proposal. The processing circuitry 130 and the data consumer may run through several iterations of exchanging proposals till an agreement is reached or till the request 120 is discarded. Rules of how the processing circuitry 130 shall handle negotiations (e.g., how many iterations are tolerated) may be defined in the global privacy policy.

The processing circuitry 130 is further configured to generate an access key 140 for accessing the data. The processing circuitry 130 may generate the access key 140, e.g., if the processing circuitry 130 has accepted the request 120 or the negotiated terms of data access conditions. The apparatus 100 further comprises second interface circuitry 150 configured to send the access key 140 to the data consumer.

The access key 140 encodes the determined access policy. For instance, the access key 140 may enable the data consumer to prove an authenticity of the access policy to a device of the user or a device managing access to the data of the user. This may avoid an unauthorized change of the access policy. In this manner, the apparatus 100 may provide privacy control services to the user.

For generating the access key 140, the processing circuitry 130 may, for instance, digitally sign the determined access policy. The digitally signed access policy may then be used as the access key 140. For digitally signing the access policy, the processing circuitry 130 may use a hash function to generate a hash of the access policy. The processing circuitry 130 may then encrypt the hash based on a private key of an asymmetric cryptographic key pair. The apparatus 100 may keep the private key secret. For verifying the digitally signed access policy, a verifier (e.g., a device of the user) may decrypt the encrypted hash based on a public key of the asymmetric cryptographic key pair. The verifier may then compare the decrypted hash to an original hash. If the decrypted hash matches the original hash, the digitally signed access policy may be verified, i.e., the verifier may assume that the access policy was generated by the processing circuitry 130 since only the processing circuitry 130 has access to the private key. A digitally signed access key may be advantageous, as the data of the user may be sent unencrypted (but anonymized) to the data consumer.

In other examples, the access key 140 may be a cryptographic access key. For instance, the processing circuitry 130 may generate the access key 140 based on attribute-based encryption. Attribute-based encryption (ABE) is a public-key encryption scheme.

In case of key-policy ABE (KP-ABE), the encryption scheme may include the following four processes (steps):

1) Setup: Setup may be performed by a randomized algorithm that outputs the public keys PK and a master key MK.
2) Encryption: Encryption may be performed by a randomized algorithm that takes as input a message M, a set of attributes Y, and the public parameters PK. It outputs a ciphertext E.
3) Key Generation: Key Generation may be performed by a randomized algorithm that takes as input an access structure A, the master key MK and the public keys PK. It outputs a decryption key D.
4) Decryption: Decryption may be performed by an algorithm that takes as input the ciphertext E that was encrypted under the set of attributes Y, the decryption key D for access structure A and the public keys PK. It outputs the message M if YEA.

For instance, the processing circuitry 130 may infer a scope of privileges the data consumer shall have from the access policy. The processing circuitry 130 may define an access structure (A) based on the scope of privileges. The access structure may be a Boolean function of Boolean variables representing the privileges. For example, the access policy may indicate that the data consumer is allowed to have long-term access to health-data of the user. The access structure may then be: {"long-term access" AND "health data"}. The processing circuitry 130 may then execute the above-mentioned algorithm Key Generation to generate the access key 140 (D) based on the access structure (A), a private key (MK) and a corresponding public key (PK). The access key 140 may be shared secretly among the apparatus 100 and the data consumer. Attributes may be assigned to the data of the user, for instance, the attribute "long-term access" may be assigned to the data if the data is meant (by the user) for this kind of usage. The data consumer may be able to decrypt a cyphertext of the data of the user based on the access key 140 only if the data has been encrypted based on the public key and the attributes "long term access" and "health data".

In case of ciphertext-policy ABE (CP-ABE), the encryption may take an access structure as input instead of attributes and the key generation takes a set of attributes as input instead of the access trees. Thus, CP-ABE and KP-ABE work with contrary principles. With KP-ABE, the processing circuitry 100 may assign an access structure to the data consumer that allows the data consumer to decrypt data if attributes assigned to the data match the privileges. With CP-ABE, the processing circuitry 130 may assign attributes to the data consumer which allows the data consumer to decrypt the data if the attributes match an access structure assigned to the data. The latter case may be advantageous since the user may be able to define a Boolean function (the access structure) describing how certain data shall be used.

In some examples, the access policy may allow the data consumer to pass on the data of the user to other data consumers. Then, Hierarchical ABE (HABE) may be used to create subkeys based on the access key 140. The subkeys may be sent to the other data consumers to give them access to the data or portions thereof.

In some examples, the request 120 of the data consumer is for accessing the data of the user on a plurality of devices of the user, for example, if the data is collected by sensors on the plurality of devices of the user. The processing circuitry 130 may then generate a plurality of access keys, of which one of them may be the access key 140. Each one of the plurality of access keys is for accessing the data on a respective one of the plurality of devices. This may be advantageous since the apparatus 100 may provide privacy control for several devices of the user and may trace a global privacy loss among all of the devices.

In some examples, the apparatus 100 may be configured to receive, from the device of the user, a copy of the data accessed by the data consumer. The apparatus 100 may comprise a data storage configured to store the copy of the data. This may be useful to send the copy to the data consumer again in case the data consumer sends another request for accessing the same data again. Moreover, the apparatus 100 may provide the copy to other data consumers requesting the same data. In the latter case, no further privacy is leaked by publishing the data again. Besides, the apparatus 100 may use the copy of the data for reporting interactions with data consumers to the user or for statistically evaluating published data of the user.

In some examples, the apparatus 100 may be configured to restore a remaining privacy budget according to a timing function defined in the global privacy policy. This may allow a long-term management of the differential privacy.

The apparatus 100 may enable the user to control (e.g., monitor and limit) a consumption of the user's data (privacy). The apparatus 100 may allow the user to track privacy consumption among several devices of the user or several sources of data. Long-term management of a privacy budget may be provided. The global privacy policy and/or the access policy may therefore define dependencies of an allocation of privacy budgets and rules of replenishment of a remaining privacy budget.

Conventional privacy control may disregard deanonymization by combining several data sources, thus, privacy protection for one data source (local privacy control) may be bypassed easily. On the contrary, the apparatus 100 may control an access to data from several data sources to avoid deanonymization of the user when data consumers combine data of the data sources. The apparatus 100 may also allow partial release of privacy of the user in accordance with preferences of the user. The apparatus 100 may provide a privacy market for negotiating privacy in return for digital services the user may benefit from.

Figure 2:
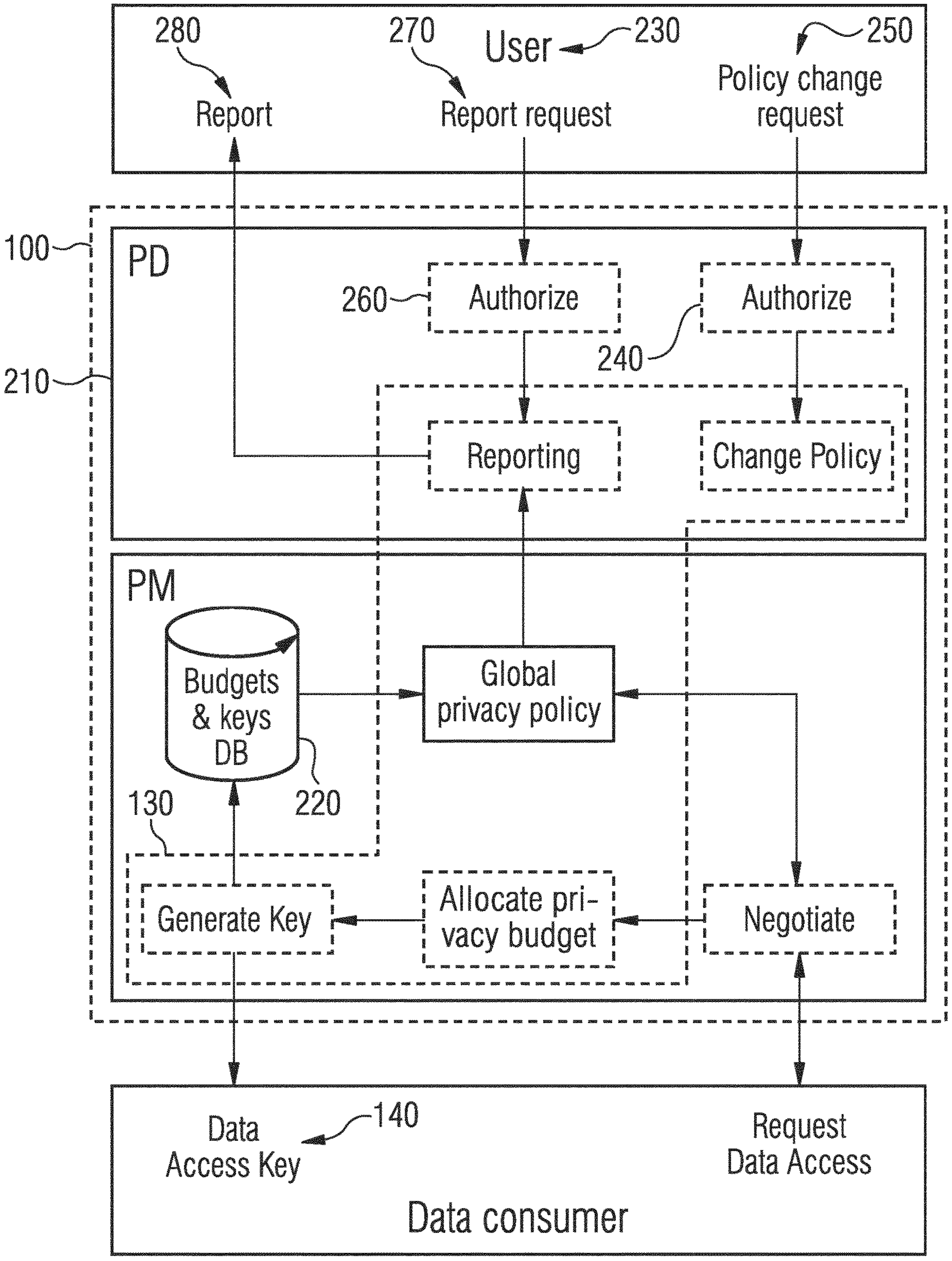
FIG. 2 illustrates another example of an apparatus for privacy control.

FIG. 2 illustrates another example of the apparatus 100 additionally including a privacy dashboard (PD) 210.

In this example, the apparatus 100 further comprises a data storage 220 configured to store privacy budgets allocated to data consumers and access key sent to the data consumers, such as the access key 140. Optionally, the data storage 220 may store information about the request 120 or the defined access policy, for instance. This may be useful to monitor privacy loss and data usage.

The PD 210 may be considered a user interface for interactions with a user device 230 of the user. The user interface may, e.g., be a webservice accessible via the Internet or an application on a computing system the user has access to.

The PD 210 includes interface circuitry 240 configured to receive, from the user device 230, a request 250 to modify the global privacy policy of the PM 100. In other words, the user may, via the user device 230, change settings of the privacy control by adjusting terms of the global privacy policy. The user may, for instance, change an allocation of privacy budgets, privacy budget pricing or may revoke a validity of active access keys. The user may revoke an access key (and the corresponding access policy) for a finite or indeterminate duration.

The interface circuitry 240 additionally authenticates the user device 230, e.g., by verifying a digital ID of the user device 230. The processing circuitry 130 is configured to modify the global privacy policy according to the request 250 of the user device 230.

The user may want to monitor a privacy loss or determine risks and attack scenarios for certain privacy areas. The user may therefore generate on the user device 230 a request 270 for a privacy report 280, e.g., including a probability that a workplace of the user is known by a certain data consumer or a probability that the gender of the user is known to colluding data consumers. The PD 210 further includes interface circuitry 260 configured to receive the request 270 for the privacy report 280 from the user device 230. The interface circuitry 260 additionally verifies an identity of the user device 230 (authenticates the user device 230).

In response to the request 270 for the privacy report 280, the processing circuitry 130 is configured to load a privacy history from a data storage, such as data storage 220. The privacy history includes, for example, information about prior requests of prior data consumers, prior defined access policies, prior allocated privacy budgets, prior access keys, prior copies of priorly requested data of the user.

The processing circuitry 130 is further configured to generate the privacy report 280 as requested by the user device 230 based on the privacy history. The privacy report 280 indicates, for example, a probability of privacy leakage for attack scenarios determined by the user, a remaining privacy budget, issued access keys, number or type of prior data consumers, digital promises issued by the prior data consumers, or a purpose of data usage. I the example of FIG. 2, the apparatus 100 is configured to send the privacy report 280 to the user device 230.

The PD 210 may enable the user to both monitor and control an allocation of privacy budgets. By recording allocated privacy budgets in an auditable record of deeds, such as data storage 220, the basis for a privacy market may be set. Thus, an exchange of privacy budgets against other goods can be foreseen as credit or as debit.

The apparatus 100 may combine a Privacy Manager (PM) handling data requests of data consumers and the PD 210. The PD 210 may be an interface to a device of the user. The PD 210 may authenticate the user, visualize privacy parameters (e.g., current privacy budget use, data consumers, purposes, or digital promises), and enable the user to adapt negotiation parameters (e.g., by adapting an allocation of privacy budgets or budget pricing, or by revoking existing access keys). The PD 210 may determine when privacy leaked is considered to decay (e.g., exponentially, or vanish after a definite period). If a data consumer requests access to several data sources concurrently, the PD 210 may issue several access keys. In the latter case, an allocation of privacy budget to each of the devices may be fixed beforehand.

The PD 210 may enable the user to define risks/attack scenarios to be tested. The PD 210 may then assess risks associated to the scenarios, optionally based on a copy of the data provided by the user device. The PD 210 may then report the risk assessment to the user.

Figure 3:
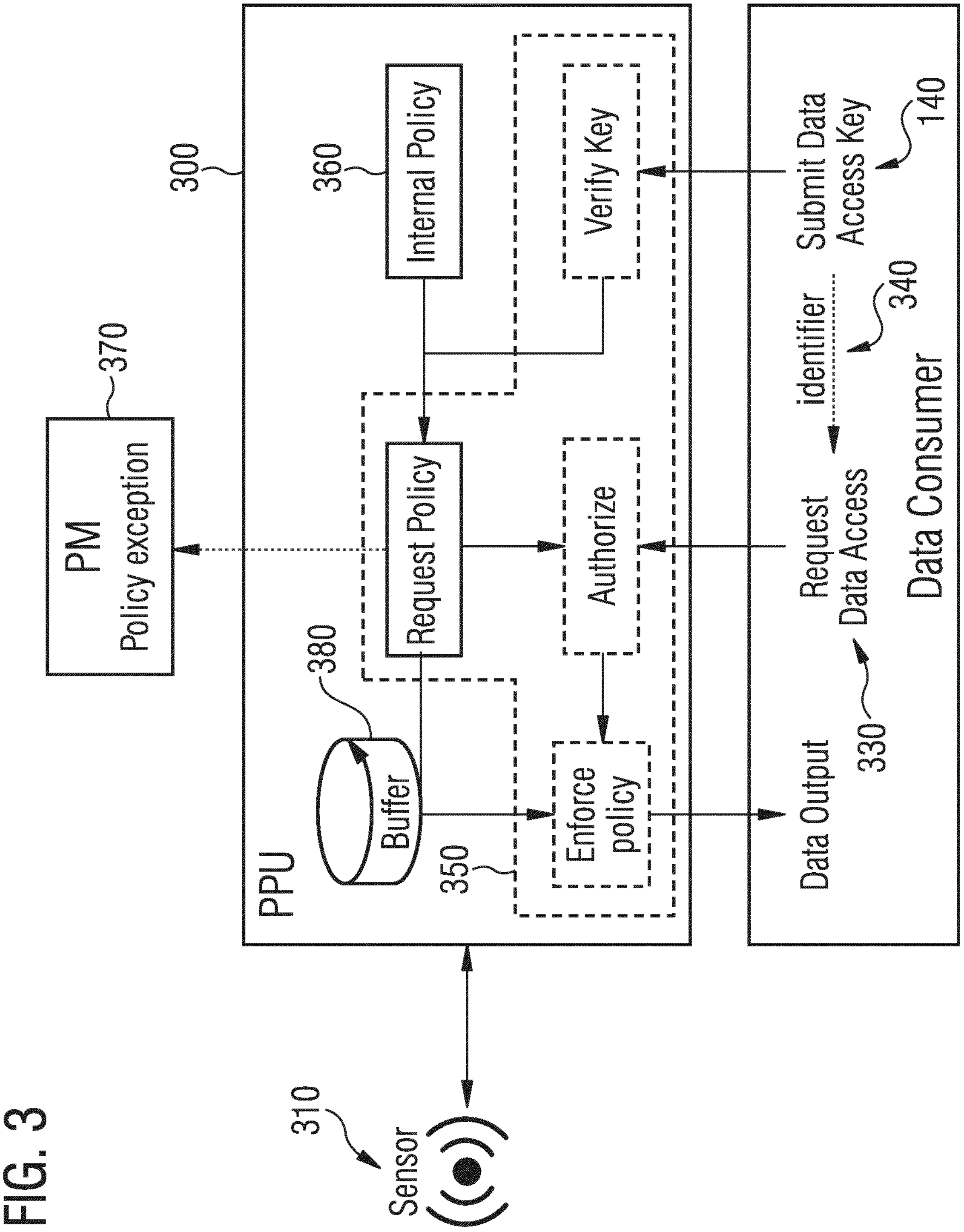
FIG. 3 illustrates an example of an apparatus for local privacy control.

FIG. 3 illustrates an example of an apparatus 300 for local privacy control.

The apparatus 300 may enable the user to control a publication of data on a device of the user. The apparatus 300 may be understood (interpreted) as a gatekeeper between the data consumer and a data source. In the example of FIG. 3, the data source is a sensor 310 capturing data of the user. The sensor 310 may be any type of sensor generating data of the user. For instance, the sensor 310 may be a GPS (Global Positioning System) tracker for tracking a position of the user or a pulse oximeter for recording information about a heart rate of the user.

The apparatus 300 is configured to receive, from a data consumer, a request 320 for accessing data of the user and the access key 140 encoding the above-mentioned access policy. For instance, the data consumer may have first received the access key 140 from the apparatus 100 described above and then provide the access key 140 to the apparatus 300.

The apparatus 300 further comprises processing circuitry 350 configured to verify the access key 140. For instance, if the access key 140 carries a digital signature of the apparatus 100, the apparatus 300 may verify the authenticity of the digital signature. If the access key 140 has been generated by the apparatus 100 based on a master key, e.g., for attribute-based encryption, the apparatus 300 may verify the access key 140 based on a public key forming an encryption counterpart to the master key.

The processing circuitry 320 may authenticate the data consumer based on a digital ID 340 attached to the request 330. The processing circuitry 320 may then authorize the request 330 by determining whether terms of the access policy are in accordance with terms of a local access policy 360 (internal policy). The local access policy 360 may specify rules of how data generated (locally) by the sensor 310 shall be used and to which extent the data is accessible by data consumers. The local access policy 360 may be adjustable by the user. If the processing circuitry 320 determines that terms of the access policy are not in accordance with the local access policy 360, the processing circuitry 320 raises a policy exception 370 and may additionally deny the request 330 for accessing the data by sending a denial report to the data consumer. Optionally, the apparatus 300 may send the policy exception 370 to a privacy manager (PM), e.g., the apparatus 100.

If it is determined that the access policy is in accordance with the local access policy 360, the processing circuitry 350 may load requested data from a buffer 380 (temporarily) storing data generated by the sensor 310. The processing circuitry 350 enforces the access policy (and the local access policy) to the requested data, for instance, the processing circuitry 350 may add noise to the requested data according to a level of noise defined in the access policy. The level of noise may have priorly been negotiated between the apparatus 100 and the data consumer for, on the one hand, avoiding unnecessary privacy loss and, on the other hand, reveal as much private information of the user as agreed by the data consumer and the privacy manager. The apparatus 300 then sends updated data, i.e., the requested data with added noise, to the data consumer.

In some examples, the apparatus 300 may be further configured to encrypt the data of the user based on attribute-based encryption. For instance, the internal policy may define which attributes or which access structure shall be attached to data generated by the sensor 310.

In other examples, the apparatus 300 may omit the step of considering the local access policy 360 for an authorization of the request 330, i.e., the apparatus 300 may regard the access policy as approved. In other examples, the apparatus 300 may receive the data from another source than the sensor 310 or may receive data from several sensors or sources.

The apparatus 300 may be a privacy processing unit, e.g., of a device of the user. The apparatus 300 may perform the following steps to allow a data consumer to access data of the user: Firstly, it may acquire an access key from the data consumer. Secondly, it may check an access policy encoded in the access key against an internal access policy. If test fails (the access policy is not in accordance with the internal access policy), it may raise a policy exception, e.g., silently, or report the exception to PM, store the exception for future access by admin, or report the exception to the data consumer. The apparatus 300 may also refuse the data access. If test succeeds, the apparatus 300 may check an identity of the data consumer, generate a data request policy defining a noising policy, check an identity of the data consumer, prepare a requested data stream or data batch. Thirdly, it may provide the data batch to the data consumer or set up the data stream for subscription. Once the data has been provided to the data consumer, the apparatus 300 may store the data in a cache for future reuse by the data consumer or by the PM.

If a privacy budget associated to the access key is depleted, the access key may be revoked. Then, the apparatus 300 may optionally still allow the data consumer to access to cached data that it previously requested.

Figure 4:
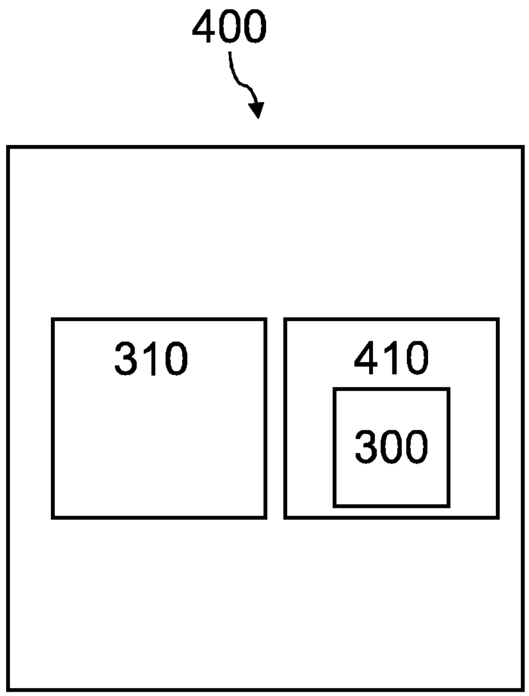
FIG. 4 illustrates an example of a device comprising an apparatus for local privacy control.

FIG. 4 illustrates an example of a device 400 comprising the apparatus 300 for local privacy control as described above. The apparatus 300 is part of a trusted execution environment (TEE) 410.

The TEE 410 is a secure area or secure enclave integrated in an untrusted environment of a computing system of the device 400. The TEE 410 may protect code and data loaded inside TEE 410 with respect to confidentiality and integrity. The TEE 410 may therefore be inaccessible from inspection and modification by an execution of untrusted code in the untrusted environment. The TEE 410 may establish an isolated execution environment that runs in parallel with an operating system of the untrusted environment. The TEE 410 may defend sensitive code and data against software attacks from the potentially compromised operating system of the device 400. The TEE may use hybrid hardware and software mechanisms to protect the sensitive code and data. The TEE 410 may not be accessible by privileged processes like an operating system or a Hypervisor of the untrusted execution environment. The TEE 410 may guarantee security of sensitive information, (i.e., content of the TEE 410 proves that it is not available for unauthorized processes), authenticity, (i.e., the TEE 410 may prove to the user that it is the intended recipient of data sent to the TEE 410), and reliability, (i.e., the TEE 410 proves that code of the TEE 410 is not tampered with and executed as intended by the user).

One example of how to realize the isolation of the TEE 410 is to use a so-called hardware root of trust. The hardware root of trust relates to a set of private keys that are embedded into a semiconductor chip during manufacturing. Usually, the keys are unique for each hardware component of the TEE 410, such that a key extracted from one hardware component cannot be used to compromise other hardware components of the TEE 410, for example, using physically unclonable functions. The private keys cannot be changed, even after software resets. Corresponding public keys reside in a manufacturer database, together with a hash of a public key belonging to a trusted party. The latter-mentioned public key is used to sign trusted firmware of the TEE 410 and control access to the TEE 410. The public key of the manufacturer is hashed; this hash is then compared to the one embedded in the TEE 410. If the hashes match, the public key is used to verify a digital signature of the trusted firmware. The trusted firmware may be used to implement remote attestation.

It is to be noted, that the description of the TEE 410 given above is meant as an example. The TEE 410 may use any other technology to establish an execution environment for code and data which is protected against modifications or inspections that are unintended or unauthorized by the user. The usage of the TEE 410 may be advantageous since an operating system of a conventional consumer device, such as a smartphone, may comprise insecure software making exfiltration of private data easy for attackers.

Referring back to FIG. 4, the device 400 further comprises a sensor, such as the sensor 310.

For instance, the device 400 may be a smartphone of a user. The smartphone may track positions of the user via a GPS sensor (310) and store the tracked positions in a TEE (410). A local privacy control application (300) may be part of the TEE and may be executed in the TEE when information about the tracked positions is requested by a data consumer, e.g., another application of the smartphone. The data consumer may establish a secure communication channel to the trusted execution environment. Then, the trusted execution environment may forward the request of the data consumer to the local privacy control application. The local privacy control application may demand an access key encoding an access policy from the data consumer for verifying privileges of the data consumer for data usage. The local privacy control application may prepare the requested data according to the access policy and forward it to the data consumer via the secure communication channel of the trusted execution environment.

In case the data consumer is part of the device 400, the device 400 may (temporarily) block communications between the data consumer and the TEE via the communication channel. IN this manner, the local privacy control application may be (temporarily) only online (accessible) for communication with a Privacy Manager, such as apparatus 100 for privacy control.

In other examples, the device 400 may comprise more than one sensor capturing data of the user and may store any kind of data of the user. The device 400 may be any device of the user.

Figure 5:
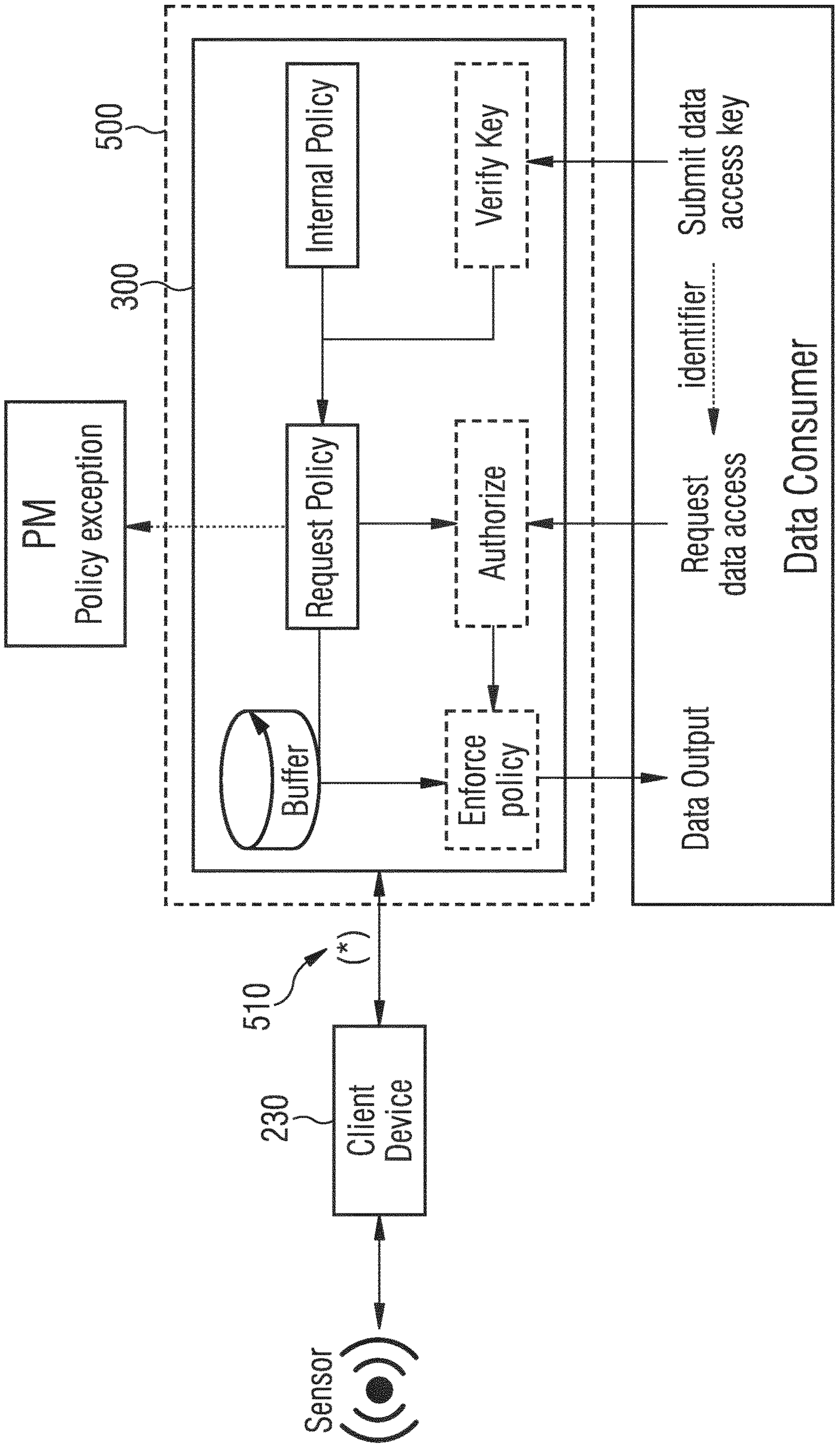
FIG. 5 illustrates an example of a cloud server comprising a trusted execution environment comprising an apparatus for local privacy control.

FIG. 5 illustrates an example of a cloud server 500 comprising a TEE which comprises the apparatus for local privacy control as described above.

The cloud server 500 may be considered a computing system, e.g., a data center, which provides computer system resources, in particular data storage and computing power, as a service to clients, such as the user, without direct active management by the clients. In other words, the cloud server 500 may usually not be in the possession or control of the user. The computer system resources may be accessible for the user, e.g., via a computer network.

The cloud server 500 may have a TEE-compatible interface 510 to receive the data from a device of the user, such as device 230, and transmit the data to the TEE. In contrast to the device 400 shown in FIG. 4, the cloud server 500 may provide local privacy control outside of a device 230 of a user. This may be advantageous since the user may still access the local privacy control services if the user loses the device 230 or if the device 230 is broken.

In other examples, the cloud server 500 may additionally comprise the apparatus 100 for privacy control. This may simplify the privacy control for the user since the user only needs to interact with one entity, the cloud server 500, for making use of local privacy control services (from the apparatus 300) and global privacy control services (from the apparatus 100). The details of the local privacy control services and the global privacy control services are described above.

The cloud server 500 may replace the apparatus 300 for local privacy control. This may be advantageous since the cloud server 500 may handle the local privacy control on behalf of the user. Additionally, the cloud server 500 may provide local privacy control for several data sources of several devices of the user.

Figure 6:
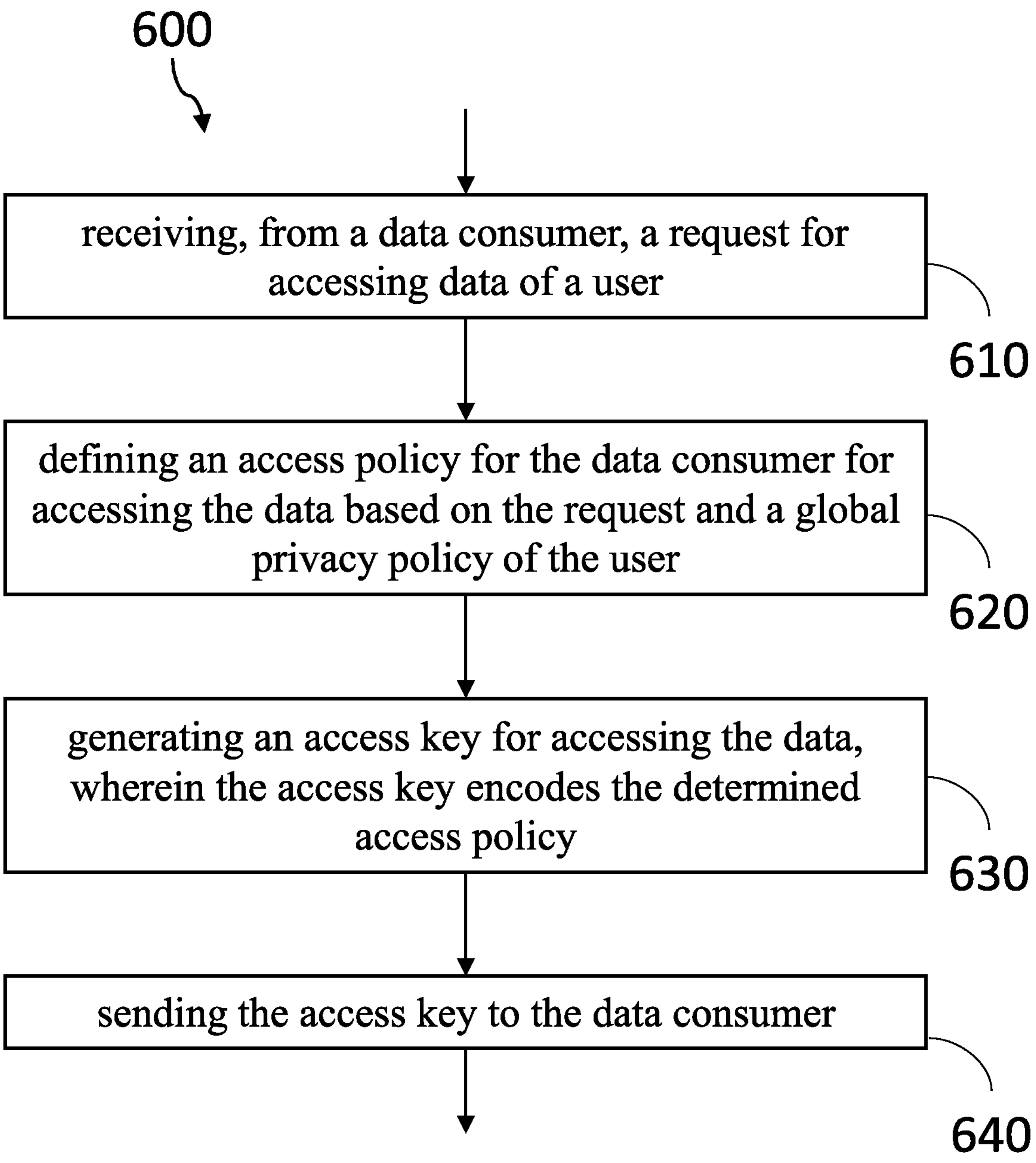
FIG. 6 illustrates a flowchart of an example of a method for privacy control.

For further explaining the proposed privacy control, FIG. 6 illustrates a flowchart of an example of a method 600 for privacy control. The method 600 comprises receiving 610, from a data consumer, a request for accessing data of a user. The method 600 further comprises defining 620 an access policy for the data consumer for accessing the data based on the request and a global privacy policy of the user. The access policy defines to what extent the data consumer is allowed to access the data. The method 600 further comprises generating 630 an access key for accessing the data.

The access key encodes the determined access policy. The method 600 further comprises sending 640 the access key to the data consumer.

The method 600 may allow the user to control access to data which is collected on several devices of the user. For instance, the method 600 may allow the user to determine that data is only shared with specific data consumers, that data is only partially published, that noise has to be added to the data before publishing it, or that data is only published for certain purposes.

More details and aspects of the method 600 are explained in connection with the proposed technique or one or more examples described above, e.g., with reference to FIGS. 1 and 2. The method 600 may comprise one or more additional optional features corresponding to one or more aspects of the proposed technique, or one or more examples described above.

Figure 7:
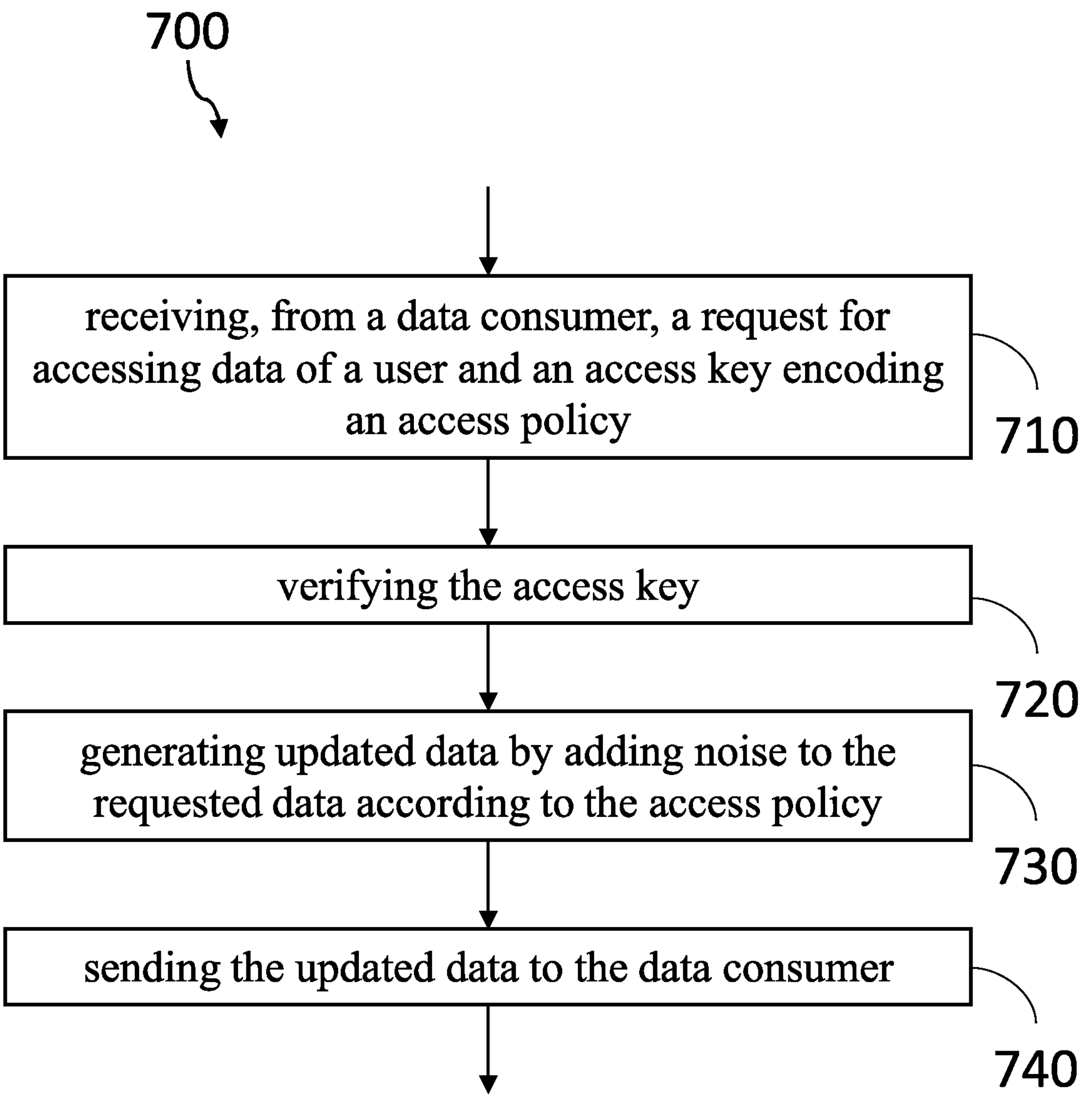
FIG. 7 illustrates a flowchart of an example of a method for local privacy control.

For further explaining the proposed local privacy control, FIG. 7 illustrates a flowchart of an example of a method 700 for local privacy control. The method 700 comprises receiving 710, from a data consumer, a request for accessing data of a user and an access key encoding an access policy. The access policy defines to what extent the data consumer is allowed to access the data. The method 700 further comprises verifying 720 the access key and generating 730 updated data by adding noise to the requested data according to the access policy. The method further comprises sending 740 the updated data to the data consumer.

The method 700 may allow the user to control a publication of data which originates from a device of the user. For instance, the method 700 may allow the user to authenticate data consumers, to give data access to data consumers only if they are authorized by a trusted entity, such as the apparatus for privacy control, or to determine rules of how the data of the device may be used or should not be used.

More details and aspects of the method 700 are explained in connection with the proposed technique or one or more examples described above, e.g., with reference to FIG. 3. The method 700 may comprise one or more additional optional features corresponding to one or more aspects of the proposed technique, or one or more examples described above.

Examples of the present disclosure may address devices capturing or collecting data of a user (e.g., from at least one sensor of the devices). The devices may be connected with a distributed system.

Examples of the present disclosure may provide a resource (data) access control for application agents (data consumers) that require access to the data. Some examples may provide customized privacy policies depending on a global privacy budget for a data subject and authorization of data consumers. Furthermore, leaked privacy of a data subject may be managed by a central entity (apparatus for privacy control) which may authorize data consumption, report privacy consumption, and serve as an interface to the user (Privacy Dashboard). The central entity may offer a backend for the privacy dashboard for managing the privacy budget and data consumer requests (Privacy Manager).

Some examples may combine (Local) Differential Privacy on a central entity (apparatus for privacy control)—allowing to measure the degree of anonymization of randomized datasets and their combinations—and one or more independent Privacy Processing Units (apparatus for local privacy control)—as gatekeeper between a data source (sensors) and insecure parts of a user device storing data generated by the data source. In some examples, a secure hardware on a cloud server the user device has access to may replace the Privacy Processing Units (cloud server). The Privacy Processing Units may accept (verify) access keys encoding an access policy, optionally consider local privacy preferences for a respective data source and provide the requested data according to the access policy. The central entity which may be accessible by the user and by data consumers may issue data access authorizations according to specific access policies. The central entity may implement long-term and aggregated privacy budget management according to DP principles.

Examples of the present disclosure may provide privacy-preserving publication of data of an individual across multiple devices of the individual. Examples may enable a publication of data in accordance with principles of Differential Privacy, thus, respecting a maximum privacy budget of the individual. A combination of a global privacy control and a local privacy control may enforce individual's preferences regarding data privacy across multiple devices and for a single data source. A privacy dashboard may allow the individual to monitor the usage of the individual's data and to adjust conditions under which data of the individual may be accessed. Attribute-based encryption may additionally allow partial release of an individual's data. Moreover, examples may form a basis for a privacy market, i.e., for negotiating with data consumers about private data of the individual.

The following examples pertain to further embodiments:

(1) An apparatus for privacy control, the apparatus comprising:

first interface circuitry configured to receive, from a data consumer, a request for accessing data of a user;

processing circuitry configured to:

define an access policy for the data consumer for accessing the data based on the request and a global privacy policy of the user, wherein the access policy defines to what extent the data consumer is allowed to access the data; and generate an access key for accessing the data, wherein the access key encodes the determined access policy; and second interface circuitry configured to send the access key to the data consumer.

(2) The apparatus of (1), wherein the request is for accessing the data of the user on a plurality of devices of the user, wherein the processing circuitry is further configured to generate a plurality of access keys for accessing the data, wherein each one of the plurality of access keys is for accessing the data on a respective one of the plurality of devices, and wherein the second interface circuitry is further configured to send the plurality of cryptographic access keys to the data consumer.

(3) The apparatus of (1) or (2), wherein the processing circuitry is further configured to:

generate an asymmetric key pair comprising a public key and a private key; and generate the access key based on the private key, wherein the apparatus further comprises third interface circuitry configured to send the public key to a device of the user to enable the device to encrypt the data of the user based on the public key.

(4) The apparatus of (3)

wherein the processing circuitry is further configured to generate the access key by digitally signing the determined access policy based on the private key.

(5) The apparatus of any one of (1) to (3),
wherein the processing circuitry is configured to generate the access key based on attribute-based encryption.
(6) The apparatus of (3) and (5),
wherein the processing circuitry is configured to generate the access key based on attribute-based encryption by:
generating the access key based on the private key and attributes de-fined in the access policy, wherein the access key enables decryption of the data if the data is encrypted based on an access structure approving the attributes.
(7) The apparatus of (3) and (5),
wherein the processing circuitry is configured to generate the access key based on attribute-based encryption by:
generating the access key based on the private key and an access structure defined in the access policy, wherein the access structure determines a decryption rule for decrypting the data if the data is encrypted based on attributes matching the access structure.
(8) The apparatus of any one of (1) to (7),
wherein the second interface circuitry is further configured to exchange negotiation data with the data consumer for negotiating terms of the access policy with the data consumer, and
wherein the processing circuitry is configured to:
determine whether the negotiated terms are in accordance with the global privacy policy; and
if it is determined that the negotiated terms are in accordance with the global privacy policy, define the access policy based on the negotiated terms.
(9) The apparatus of any one of (1) to (8),
wherein the processing circuitry is further configured to:
determine a remaining privacy budget; and
allocate a privacy budget to the request in accordance with the remaining privacy budget.
(10) The apparatus of any one of (1) to (9), further comprising:
a data storage configured to store at least one of the request, the defined access policy, an allocated privacy budget, and the access key.
(11) The apparatus of any one of (1) to (10), further comprising:
fourth interface circuitry configured to receive, from a device of the user, a copy of the data accessed by the data consumer; and
a data storage configured to store the copy of the data.
(12) The apparatus of any one of (1) to (11), further comprising:
fifth interface circuitry configured to receive, from a device of the user, a request for a privacy report,
wherein, in response to the request for the privacy report, the processing circuitry is further configured to:
load a privacy history from a data storage, wherein the privacy history indicates at least one of prior requests of prior data consumers, prior defined access policies, prior allocated privacy budgets, prior access keys, and prior copies of priorly requested data of the user; and
generate the privacy report based on the privacy history; and
sixth interface circuitry configured to send the privacy report to the device of the user.
(13) The apparatus of (12),
wherein the privacy report indicates at least one of a probability of privacy leakage for at least one attack scenario, a remaining privacy budget, issued access keys, number or type of the prior data consumers, digital promises issued by the prior data consumers, purpose of data usage.
(14) The apparatus of any one of (1) to (13), further comprising:
seventh interface circuitry configured to receive, from a device of the user, a request to modify the global privacy policy,
wherein the processing circuitry is further configured to modify the global privacy policy according to the request of the user.
(15) The apparatus of any one of (1) to (14),
wherein the processing circuitry is further configured to restore a remaining privacy budget according to a timing function defined in the global privacy policy.
(16). An apparatus for local privacy control, comprising
first interface circuitry configured to receive, from a data consumer, a request for accessing data of a user and an access key encoding an access policy, wherein the access policy defines to what extent the data consumer is allowed to access the data;
processing circuitry configured to:
verify the access key; and
generate updated data by adding noise to the requested data according to the access policy; and second interface circuitry configured to send the updated data to the data consumer.
(17) The apparatus of (16), further comprising:
third interface circuitry configured to receive, from a sensor of the user, the data of the user;
and a data storage configured to store the data.
(18) The apparatus of (16) or (17),
wherein the processing circuitry is configured to generate the updated data by enforcing the access policy and/or a local access policy.
(19) The apparatus of any one of (16) to (18),
wherein the processing circuitry is further configured to generate the updated data by encrypting the data based on attribute-based encryption.
(20) The apparatus of any one of (16) to (19),
wherein the processing circuitry is further configured to:
determine whether the access policy is in accordance with a local access policy; and
if it is determined that the access policy is in accordance with the local access policy, generate the updated data.
(21) The apparatus of (20),
wherein the processing circuitry is further configured to:
if it is determined that the access policy is not in accordance with the local access policy, deny the request of the data consumer; and
raise a policy exception.
(22) The apparatus of (21),
fourth interface circuitry configured to send the policy exception to an apparatus for privacy control of any one of (1) to (15).
(23) The apparatus of any one of (16) to (22),
wherein the processing circuitry is further configured to check an identity of the data consumer based on a digital identifier provided by the data consumer.
(24) A device, comprising:
the apparatus for local privacy control of any one of (16) to (23), wherein the apparatus is part of a trusted execution environment; and
at least one sensor configured to generate data of the user and send the data to the apparatus.

(25) A cloud server, comprising:

a trusted execution environment comprising the apparatus for local privacy control of any one of (16) to (23); and interface circuitry configured to:

receive the data from a device of the user; and transmit the data to the trusted execution environment.

(26) The cloud server of (25), wherein the trusted execution environment further comprises the apparatus for privacy control of any one of (1) to (15).

(27) Method for privacy control, receiving, from a data consumer, a request for accessing data of a user;

defining an access policy for the data consumer for accessing the data based on the request and a global privacy policy of the user, wherein the access policy defines to what extent the data consumer is allowed to access the data;

generating an access key for accessing the data, wherein the access key encodes the determined access policy; and sending the access key to the data consumer.

(28) Method for local privacy control, comprising receiving, from a data consumer, a request for accessing data of a user and an access key encoding an access policy, wherein the access policy defines to what extent the data consumer is allowed to access the data;

verifying the access key;

generating updated data by adding noise to the requested data according to the access policy;

and sending the updated data to the data consumer.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for privacy control, the apparatus comprising:

first interface circuitry configured to receive, from a data consumer, a request for accessing data of a user, the request including a first proposal of access terms;

processing circuitry configured to:

determine a remaining privacy budget, wherein a global privacy policy specifies a maximum privacy budget defining how much privacy of the user may be leaked;

allocate a privacy budget to the data consumer based on the request and the remaining privacy budget;

determine whether the first proposal of access terms is in accordance with the global privacy policy of the user, and, in response to determining that the first proposal of access terms is not in accordance with the global privacy policy of the user, generate a second proposal of access terms based on the global privacy policy of the user and at least partly on the first proposal of access terms;

exchange, via second interface circuitry, the second proposal of access terms with the data consumer, and receive from the data consumer one of an acceptance of the second proposal of access terms and a further proposal of access terms, until negotiated terms in accordance with the global privacy policy of the user are reached or the request is discarded according to a number of negotiation iterations defined in the global privacy policy of the user;

define an access policy for the data consumer for accessing the data based on the negotiated terms, the global privacy policy of the user, and the allocated privacy budget, wherein the access policy defines to what extent the data consumer is allowed to access the data, wherein the access policy specifies the allocated privacy budget, and wherein the access policy specifies a level of noise to be added to the data based on the allocated privacy budget, wherein a higher allocated privacy budget permits access to the data with a lower level of noise; and generate an access key for accessing the data by digitally signing the determined access policy based on a private key of the apparatus, wherein the access key encodes the determined access policy including the specified level of noise; and the second interface circuitry is further configured to send the access key to the data consumer, wherein the access key enables enforcement of the level of noise at a device storing the data, the device storing the data being separate from the apparatus, wherein noise is added to the data by the device storing the data, in response to the device storing the data verifying a digital signature of the access key received from the data consumer, according to the level of noise specified in the access key prior to providing the data to the data consumer.

2. The apparatus of claim 1, wherein the request is for accessing the data of the user on a plurality of devices of the user, wherein the processing circuitry is further configured to generate a plurality of access keys for accessing the data, wherein each one of the plurality of access keys is for accessing the data on a respective one of the plurality of devices, and wherein the second interface circuitry is further configured to send the plurality of access keys to the data consumer.

3. The apparatus of claim 1, wherein the processing circuitry is further configured to:

generate an asymmetric key pair comprising a public key and a private key; and generate the access key based on the private key, wherein the apparatus further comprises third interface circuitry configured to send the public key to a device of the user to enable the device to encrypt the data of the user based on the public key.

4. The apparatus of claim 3, wherein the processing circuitry is configured to generate the access key based on attribute-based encryption by:

generating the access key based on the private key and attributes defined in the access policy, wherein the access key enables decryption of the data if the data is encrypted based on an access structure approving the attributes.

5. The apparatus of claim 3, wherein the processing circuitry is configured to generate the access key based on attribute-based encryption by:

generating the access key based on the private key and an access structure defined in the access policy, wherein the access structure determines a decryption rule for decrypting the data if the data is encrypted based on attributes matching the access structure.

6. The apparatus of claim 1, wherein the processing circuitry is configured to generate the access key based on attribute-based encryption.

7. The apparatus of claim 1, wherein the processing circuitry is further configured to:

determine a remaining privacy budget; and allocate a privacy budget to the request in accordance with the remaining privacy budget.

8. The apparatus of claim 1, further comprising:

fifth interface circuitry configured to receive, from a device of the user, a request for a privacy report, wherein, in response to the request for the privacy report, the processing circuitry is further configured to:

load a privacy history from a data storage, wherein the privacy history indicates at least one of prior requests of prior data consumers, prior defined access policies, prior allocated privacy budgets, prior access keys, and prior copies of priorly requested data of the user; and generate the privacy report based on the privacy history; and sixth interface circuitry configured to send the privacy report to the device of the user.

9. The apparatus of claim 8, wherein the request for the privacy report identifies an attack scenario defined by the user.

10. The apparatus of claim 1, further comprising:

seventh interface circuitry configured to receive, from a device of the user, a request to modify the global privacy policy, wherein the processing circuitry is further configured to modify the global privacy policy according to the request of the user.

11. An apparatus for local privacy control, comprising first interface circuitry configured to receive, from a data consumer, a request for accessing data of a user and a digital identifier of the data consumer, and an access key encoding an access policy, wherein the access policy defines to what extent the data consumer is allowed to access the data, wherein the access policy specifies an allocated privacy budget and a level of noise to be added to the data based on the allocated privacy budget, and wherein a higher allocated privacy budget permits access to the data with a lower level of noise;

processing circuitry configured to:

verify the access key by verifying a digital signature of the access key based on a public key corresponding to a private key of an apparatus for privacy control that issued the access key;

authenticate the data consumer based on the digital identifier of the data consumer;

in response to verification of the access key and authentication of the data consumer, generate updated data by adding noise to the requested data according to the access policy, wherein the processing circuitry adds the noise at the level of noise specified in the access policy; and in response to depletion of the allocated privacy budget specified in the access policy, revoke the access key while permitting the data consumer to continue accessing, from a cache of the apparatus, updated data previously sent to the data consumer; and second interface circuitry configured to send the updated data to the data consumer, wherein the noise is added to the data according to the level of noise specified in the access key prior to sending the updated data to the data consumer.

12. The apparatus of claim 11, wherein the processing circuitry is configured to generate the updated data by enforcing the access policy and/or a local access policy.

13. The apparatus of claim 11, wherein the processing circuitry is further configured to generate the updated data by encrypting the data based on attribute-based encryption.

14. The apparatus of claim 11, wherein the processing circuitry is further configured to:

determine whether the access policy is in accordance with a local access policy; and if it is determined that the access policy is in accordance with the local access policy, generate the updated data.

15. The apparatus of claim 14, wherein the processing circuitry is further configured to:

if it is determined that the access policy is not in accordance with the local access policy, deny the request of the data consumer; and raise a policy exception.

16. A device, comprising:

the apparatus for local privacy control of claim 11, wherein the apparatus is part of a trusted execution environment; and at least one sensor configured to generate data of the user and send the data to the apparatus.

17. A cloud server, comprising:

a trusted execution environment comprising the apparatus for local privacy control of claim 11; and interface circuitry configured to:

receive the data from a device of the user; and transmit the data to the trusted execution environment.

18. The cloud server of claim 17, wherein the trusted execution environment further comprises the apparatus for privacy control of claim 1.

19. A method for privacy control, comprising:

receiving, from a data consumer, a request for accessing data of a user, the request including a first proposal of access terms;

determining a remaining privacy budget, wherein a global privacy policy specifies a maximum privacy budget defining how much privacy of the user may be leaked;

allocating a privacy budget to the data consumer based on the request and the remaining privacy budget;

determining whether the first proposal of access terms is in accordance with the global privacy policy of the user, and, in response to determining that the first proposal of access terms is not in accordance with the global privacy policy of the user, generating a second proposal of access terms based on the global privacy policy of the user and at least partly on the first proposal of access terms;

exchanging the second proposal of access terms with the data consumer, and receiving from the data consumer one of an acceptance of the second proposal of access terms and a further proposal of access terms, until negotiated terms in accordance with the global privacy policy of the user are reached or the request is discarded according to a number of negotiation iterations defined in the global privacy policy of the user;

defining an access policy for the data consumer for accessing the data based on the negotiated terms, the global privacy policy of the user, and the allocated privacy budget, wherein the access policy defines to what extent the data consumer is allowed to access the data, wherein the access policy specifies the allocated privacy budget, and wherein the access policy specifies a level of noise to be added to the data based on the allocated privacy budget, wherein a higher allocated privacy budget permits access to the data with a lower level of noise;

generating an access key for accessing the data by digitally signing the determined access policy based on a private key, wherein the access key encodes the determined access policy including the specified level of noise; and sending the access key to the data consumer, wherein the access key enables enforcement of the level of noise at a device storing the data, the device storing the data being separate from an apparatus performing the method, wherein noise is added to the data by the device storing the data, in response to the device storing the data verifying a digital signature of the access key received from the data consumer, according to the level of noise specified in the access key prior to providing the data to the data consumer.

20. A method for local privacy control, comprising receiving, from a data consumer, a request for accessing data of a user and a digital identifier of the data consumer, and an access key encoding an access policy, wherein the access policy defines to what extent the data consumer is allowed to access the data, wherein the access policy specifies an allocated privacy budget and a level of noise to be added to the data based on the allocated privacy budget, and wherein a higher allocated privacy budget permits access to the data with a lower level of noise;

verifying the access key by verifying a digital signature of the access key based on a public key corresponding to a private key of an apparatus for privacy control that issued the access key;

authenticating the data consumer based on the digital identifier of the data consumer;

in response to verification of the access key and authentication of the data consumer, generating updated data by adding noise to the requested data according to the access policy, wherein the noise is added at the level of noise specified in the access policy; and in response to depletion of the allocated privacy budget specified in the access policy, revoking the access key while permitting the data consumer to continue accessing, from a cache, updated data previously sent to the data consumer; and sending the updated data to the data consumer, wherein the noise is added to the data according to the level of noise specified in the access key prior to sending the updated data to the data consumer.

* * * * *